US008340955B2

United States Patent
Brown et al.

(10) Patent No.: US 8,340,955 B2
(45) Date of Patent: Dec. 25, 2012

(54) SYSTEM AND METHOD FOR FINDING THE MOST LIKELY ANSWER TO A NATURAL LANGUAGE QUESTION

(75) Inventors: Eric W. Brown, New Fairfield, CT (US); Anni R. Coden, Bronx, NY (US); John Martin Prager, Pomona, NY (US); Dragomir Radkov Radev, Ann Arbor, MI (US); Valerie Samn, New York, NY (US)

(73) Assignee: International Business Machines Corporation, Armonk, NY (US)

(*) Notice: Subject to any disclaimer, the term of this patent is extended or adjusted under 35 U.S.C. 154(b) by 1060 days.

(21) Appl. No.: 12/110,481

(22) Filed: Apr. 28, 2008

(65) Prior Publication Data
US 2008/0201132 A1   Aug. 21, 2008

Related U.S. Application Data

(63) Continuation of application No. 09/713,075, filed on Nov. 15, 2000, now abandoned.

(51) Int. Cl.
*G06F 17/27* (2006.01)
(52) U.S. Cl. ........... 704/9; 704/1; 707/706; 707/707; 707/708
(58) Field of Classification Search .......... 704/1, 9, 704/1.9; 707/706–708
See application file for complete search history.

(56) References Cited

U.S. PATENT DOCUMENTS

| | | | | |
|---|---|---|---|---|
| 4,270,182 A * | 5/1981 | Asija | | 704/8 |
| 5,371,673 A * | 12/1994 | Fan | | 704/1 |
| 5,404,507 A * | 4/1995 | Bohm et al. | | 1/1 |
| 5,519,608 A | 5/1996 | Kupiec | | 704/9 |
| 5,696,962 A | 12/1997 | Kupiec | | 707/4 |
| 5,761,418 A * | 6/1998 | Francis et al. | | 709/201 |
| 5,802,493 A * | 9/1998 | Sheflott et al. | | 705/1.1 |
| 5,933,822 A | 8/1999 | Braden-Harder et al. | | 707/5 |
| 5,948,054 A * | 9/1999 | Nielsen | | 709/200 |
| 5,953,718 A | 9/1999 | Wical | | 707/5 |
| 6,269,368 B1 | 7/2001 | Diamond | | 707/6 |
| 6,289,342 B1 * | 9/2001 | Lawrence et al. | | 1/1 |
| 6,418,434 B1 * | 7/2002 | Johnson et al. | | 1/1 |
| 6,665,666 B1 * | 12/2003 | Brown et al. | | 1/1 |
| 6,675,159 B1 | 1/2004 | Lin et al. | | 707/3 |
| 6,745,181 B1 | 6/2004 | Chang et al. | | 707/4 |
| 6,766,320 B1 | 7/2004 | Wang et al. | | 707/5 |
| 6,999,963 B1 * | 2/2006 | McConnell | | 1/1 |
| 2002/0026435 A1 * | 2/2002 | Wyss et al. | | 707/1 |

* cited by examiner

*Primary Examiner* — David R Hudspeth
*Assistant Examiner* — Lamont Spooner

(57) ABSTRACT

Automated question answering is disclosed that relates to the selection of an answer to a question from a pool of potential answers which are manually or automatically extracted from a large collection of textual documents. The a feature extraction component, a feature combination component, an answer selection component, and an answer presentation component, among others, are included. The input to the system is a set of one or more natural language questions and a collection of textual document The output is a (possibly ranked) set of factual answers to the questions, these answers being extracted from the document collection.

11 Claims, 8 Drawing Sheets

FIG.2

201 — WHO WAS JOHNNY MATHIS' HIGH SCHOOL TRACK COACH?

FIG.5

501 —
LOU VASQUEZ

TIM O'DONOHUE

ATHLETIC DIRECTOR DAVE COWEN

JOHNNY CEBALLOS

CIVIC CENTER DIRECTOR MARTIN

DURHAM

JOHNNY HODGES

DERRIC EVANS

```
<p><NUMBER>1</NUMBER></p>
<p><QUERY>Who is the author of the book, "The Iron Lady: A
Biography of Margaret Thatcher"?</QUERY></p>
<p><PROCESSED_QUERY>@excwin (*dynamic* @weight (2.0000101
*Iron_Lady) @weight (200 Biography_of_Margaret_Thatcher)
@weight (200 Margaret) @weight (100 author) @weight (100 book)
@weight (100 iron) @weight (100 lady) @weight (100 :) @weight (100
biography) @weight (100 thatcher) @weight (400 @syn (PERSON$ NAME$)
)</PROCESSED_QUERY></p>
<p><DOC>LA090290-0118</DOC></p>
<p><SCORE>1020.8114</SCORE></p>
<TEXT><p> THE IRON LADY; A <span class="NAME">Biography of
Margaret Thatcher</span> by <span class="PERSON">Hugo
Young</span> (<span class="ORG">Farrar, Straus & Giroux</span>).
The central riddle revealed here is why, as a woman <span
class="PLACEDEF">in a man</span>'s world, <span
class="PERSON">Margaret Thatcher</span> evinces such an
exclusionary attitude toward women.</p></TEXT>
```

FIG.3

| POTENTIAL ANSWER | TYPE | NUMBER | RSPANNO | COUNT | NOTINQ | TYPE | AVGDST | SSCORE | TOTAL |
|---|---|---|---|---|---|---|---|---|---|
| LOU VASQUEZ | PERSON | 1 | 1 | 6 | 2 | 1 | 16 | 0.02507 | -9.93 |
| TIM O'DONOHUE | PERSON | 17 | 1 | 4 | 2 | 1 | 8 | 0.02257 | -12.57 |
| ATHLETIC DIRECTOR | PERSON | 23 | 6 | 4 | 4 | 1 | 11 | 0.02257 | -15.87 |
| DAVE COWEN | | | | | | | | | |
| JOHNNY CEBALLOS | PERSON | 22 | 5 | 4 | 1 | 1 | 9 | 0.02257 | -19.07 |
| CIVIC CENTER DIRECTOR | PERSON | 13 | 1 | 2 | 5 | 1 | 16 | 0.02505 | -19.36 |
| MARTIN DURHAM | | | | | | | | | |
| JOHNNY HODGES | PERSON | 25 | 2 | 4 | 1 | 1 | 15 | 0.02256 | -25.22 |
| DERRIC EVANS | PERSON | 33 | 4 | 4 | 2 | 1 | 14 | 0.02256 | -25.37 |
| NEWSWIRE JOHNNY | PERSON | 30 | 1 | 4 | 2 | 1 | 17 | 0.02256 | -25.47 |
| MAJORS | | | | | | | | | |
| WOODBRIDGE HIGH | ORG | 18 | 2 | 4 | 1 | 2 | 6 | 0.02257 | -28.37 |
| SCHOOL | | | | | | | | | |
| EVAN | PERSON | 37 | 6 | 4 | 1 | 1 | 14 | 0.02256 | -29.57 |
| GARY EDWARDS | PERSON | 38 | 7 | 4 | 2 | 1 | 17 | 0.02256 | -30.87 |
| O.J.SIMPSON | NAME | 2 | 2 | 6 | 2 | 3 | 12 | 0.02507 | -37.40 |
| SOUTH LAKE TAHOE | NAME | 7 | 5 | 6 | 3 | 3 | 14 | 0.02507 | -40.06 |
| WASHINGTON HIGH | NAME | 10 | 6 | 6 | 1 | 3 | 18 | 0.02507 | -49.80 |
| MORGAN | NAME | 26 | 3 | 4 | 1 | 3 | 12 | 0.02256 | -52.52 |
| TENNESSEEFOOTBALL | NAME | 31 | 2 | 4 | 1 | 3 | 15 | 0.02256 | -56.27 |
| ELLINGTON | NAME | 24 | 1 | 4 | 1 | 3 | 20 | 0.02256 | -59.42 |
| ASSISTANT | ROLE | 21 | 4 | 4 | 1 | 4 | 8 | 0.02257 | -62.77 |
| THE VOLUNTEERS | ROLE | 34 | 5 | 4 | 2 | 4 | 14 | 0.02257 | -71.17 |
| JOHNNY MATHIS | PERSON | 4 | 4 | 6 | -100 | 1 | 11 | 0.02256 | -211.33 |
| MATHIS | NAME | 14 | 2 | 2 | -100 | 3 | 10 | 0.02505 | -254.16 |
| COACH | ROLE | 19 | 3 | 4 | -100 | 4 | 4 | 0.02257 | -259.67 |

FIG. 4

| Document ID | Score | Extract |
|---|---|---|
| LA053189-0069 | -9.93 | Lou Vasquez, track coach of O.J. Simpson, Ollie Matson and Johnny Mathis during his 32-year career, died Saturday while at his South Lake Tahoe vacation cabin, it was announced Tuesday. He was 68. His Washington High School teams won five consecu |
| LA060889-0181 | -12.57 | Tim O'Donohue, Woodbridge High School's varsity baseball coach, resigned Monday and will replaced by assistant Johnny Ceballos, Athletic Director Dave Cowen said. |
| LA062090-0017 | -19.36 | Civic Center Director Martin Durham said Mathis was to have entered the parking lot in a convertible Rolls-Royce to cut the ribbon for the dedication of Johnny Mathis |
| LA052390-0122 | -25.22 | Ellington liked what he heard. Johnny Hodges was quitting the band and Morgan was invited to replace him, but he couldn't leave high school to go on the road. The new album's title track and "In a Sentimental Mood" are Morgan's most recent homages |
| LA062389-0083 | -25.37 | NEWSWIRE Johnny Majors, Tennessee football coach, said that prize recruit Derric Evans will not be allowed to play for the Volunteers because of his arrest Tuesday night in Dallas. Evans and high school teammate, Gary Edwards, were charged with |

FIG.6

SYSTEM AND METHOD FOR FINDING THE MOST LIKELY ANSWER TO A NATURAL LANGUAGE QUESTION

CROSS-REFERENCE TO RELATED APPLICATIONS

This application is a continuation of U.S. patent application Ser. No. 09/713,075, filed Nov. 15, 2000 now abandoned, which is related to commonly-assigned U.S. patent application Ser. No. 09/495,645, filed Feb. 1, 2000, each incorporated by reference herein.

FIELD OF THE INVENTION

This invention relates to the field of automated question answering. More specifically, the invention relates to the selection of an answer to a question from a pool of potential answers which are manually or automatically extracted from a large collection of textual documents.

BACKGROUND OF THE INVENTION

Information retrieval (IR) is the process of locating documents in a collection or from an unbounded set such as the Web based on an expression of a human user's information need. The user's information need is typically expressed in the form of a query which consists of a set of keywords and/or logical operators. A particular type of information retrieval is Question Answering (Q&A).

Unlike information retrieval, in Q&A the user expresses his or her information need in the form of a factual natural language question (e.g., "who played Don Vito Corleone in the movie 'The Godfather'?").

Unlike information retrieval, Q&A returns a short snippet or snippets of text (e.g., phrases) which provide the exact answer to the question rather than a document or set of documents related to the question.

Unlike information retrieval, Q&A systems must understand the user's questions to a deeper level, e.g., properly dealing with negations ("Not") and/or the question's discourse, logical, or temporal structure ("Which U.S. president succeeded Nixon?", "What is the smallest country in Europe?") When given an input such as "What is the capital of India?", an IR-based system will typically return documents about India and about capital (in all of its possible senses) but not necessarily documents which contain the answer "New Delhi". Q&A systems will weed out the wrong senses of capital (e.g., "financial capital") and concentrate on the meaning of that word ("head city") that fits best the overall structure of the question.

EXAMPLE

|  | Information Retrieval (IR) | Question Answering (Q&A) |
| --- | --- | --- |
| user input | query: environmental protection organizations in developing countries | natural language question: What is the capital of Delaware? |
| system output | documents: http://www.envorg.br http://www.ioe.int | answer(s): Dover |
| input processing | keyword based | natural language based |

-continued

|  | Information Retrieval (IR) | Question Answering (Q&A) |
| --- | --- | --- |
| main advantage | can return partially related documents | precise answer, not buried in unneeded text |

Further information on information retrieval and text analysis can be found in, for example, Baeza-Yates and Ribeiro-Neto, "Modern Information Retrieval", ACM Press, New York, 1999; Ravin and Wacholder, "Extracting Names from Natural-Language Text", IBM Research Report 20338, 1996; Byrd and Ravin, "Identifying and Extracting Relations in Text", Proceedings of NLDB 99, Klagenfurt, Austria, 1999. Further information on Question Answering can be found in Kupiec, "MURAX: A Robust Linguistic Approach For Question Answering Using An On-Line Encyclopedia", *Proc. of SIGIR* 1993, Pittsburgh, Pa., 1993; Prager et al., "The Use of Predictive Annotation for Question-Answering in TREC8", *Proc of IREC*8, Gaithersburg, Md., 2000; Prager; "Question-Answering by Predictive Annotation", *Proc of SIGIR* 2000, Athens, Greece, 2000; Radev et al., "Ranking Suspected Answers to Natural Language Questions using Predictive Annotation", *Proc. of ANLP* '00, Seattle, Wash., 2000.

STATEMENT OF PROBLEMS WITH THE PRIOR ART

Recently, some search engines accessible from the Web have started to provide question answering services. A notable example is Ask Jeeves (www.ask.com) (Ask Jeeves and Ask com are service marks of Ask Jeeves, Inc.). Ask Jeeves uses a fairly simple keyword-based approach to give the user a feeling of a "natural language inter face". For example, a question such as "What is the capital of Kenya" is apparently correctly interpreted but it returns pointers to several Web sites with information about Kenya, one of which does include the correct answer ("Nairobi") However, related questions such as "How long does it take to fly from New York to London on the Concorde" produces instead a set of questions related to the original question asked by the user. The user then has to select which of the suggested paraphrases is most likely to return answers to the original question. Examples of such follow-up questions include "Where can I find cheap flights from the UK?" The method used to produce answers apparently consists of five steps: (a) partially parse the query; (b) map the query to a canned set of manually produced questions or question templates; (c) map canned questions to existing knowledge bases (Ask Jeeves points to other people's web sites for the teal data: FAQs, authoritative pages, travel agencies, etc.); (d) do a meta search on 5 big search engines (and return their answers); and (e) if there is no match in "b" then record the query for later human analysis Note that "b" is essentially a person-intensive task—it involves the creation of a list of key phrases and the canned questions that they map to (and then the underlying pages that they map to)

Two things that systems such as Ask Jeeves don't do are: (a) provide a precise answer to a factual question; and (b) restrict their output to only the relevant answer by getting rid of other text from the same document that does not include the answer. A third problem with such systems is their overly large dependence on human knowledge engineering.

OBJECTS OF THE INVENTION

An object of this invention is an improved system, method, and program product for answering natural language questions from either network sites or from document collections physically or virtually residing on the user's local area network (LAN) or intranet.

An object of this invention is an improved system, method, and program product for providing precise answers to factual questions.

An object of this invention is an improved system, method, and program product which outputs an answer to a user's question without adding unnecessary content around the answer.

An object of this invention is an improved system, method, and program product which contains an embodiment of a natural language component that better analyzes and understands queries asked in the form of questions An object of this invention is an improved system, method, and program product which uses a mathematical model of properties of textual documents to provide better understanding of the user's question and a better set of resulting answers.

SUMMARY OF THE INVENTION

The foregoing and other problems are overcome by methods and apparatus in accordance with embodiments of this invention.

This invention is a computer system, method, and program product that contains a feature extraction module, a feature combination module, an answer selection module, and an answer presentation module.

The feature extraction module computes automatically certain properties of the question and the documents from which the answer is to be extracted. Among these properties, potential answers to the question are also extracted and annotated with the features already extracted The feature combination module provides an automated mechanism for characterizing properties of the documents and question as well as the features and potential answers extracted by the feature extraction module The answer selection module ranks the potential answers based on an objective score produced by the feature combination module. As a result, answers that are more likely to represent the correct answer to a question are ranked higher.

The answer presentation module presents the highest ranked potential answers to the user by providing a variable (specified by the user) amount of context.

BRIEF DESCRIPTION OF THE DRAWINGS

The above set forth and other features of the invention are made more apparent in the ensuing Detailed Description of the Invention when read in conjunction with the attached Drawings, wherein:

FIG. 2 depicts an example of questions posed by the user.

FIG. 3 describes the expected input by the invention in the form of annotated (or indexed) document passage or passages.

FIG. 4 illustrates some sample features (7) extracted by the feature extraction module (1) as well as the output (8) of the feature combination module (2) shown in the TOTAL column and the list of potential answers (9).

FIG. 5 indicates which potential answers (11) from the set (10) have been selected by the answer selection module (3).

FIG. 6 displays the output of the answer presentation module (4). The output can consist of either (a) the top-ranked answers or (b) the top-ranked answers plus some context, or (c) the documents in which the top-ranked answers occur. In all cases, a pointer to the original document may be included.

DETAILED DESCRIPTION OF THE INVENTION

The present invention better satisfies a user's information need by providing precise answers to factual natural language questions.

Figure 1:
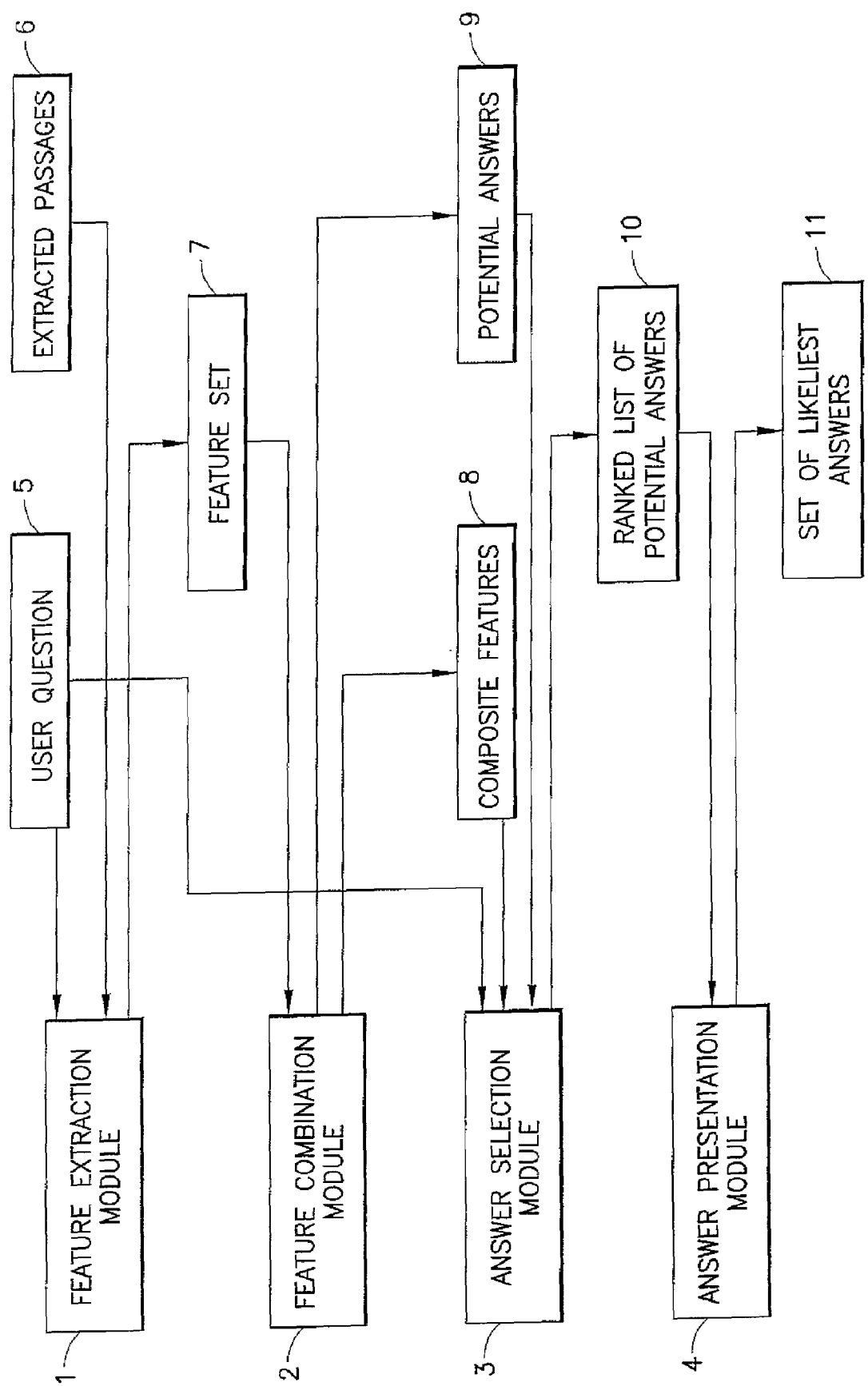
FIG. 1 is an overall block diagram of the basic architecture of the invention.

FIG. 1 shows the basic architecture of the system in a non-limiting preferred embodiment. The system contains at least foul components: a feature extraction module (1), a feature combination module (2), an answer selection module (3), and an answer presentation module (4).

An indexed set of document passages (6) is suspected to contain an answer to the user's natural language question (5). The feature extraction module (1) computes a set of features from the input documents (6) and the natural language question (5). These features awe stored in per-document, per-question feature set (7). Among the features that are used in (1) are (a) the proximity of words from the question to words from the document; (b) the number of overlapping words between the question and the document, (c) the number of times that a given document contains the same text, etc An example of a user question (5) is shown in FIG. 2. Item 201 is the user question. Similarly, an example of the indexed documents in the preferred embodiment appears in FIG. 3. Item 300 represents a sample annotated input passage. In the preferred embodiment and as illustrated in FIG. 3, the input passage consists of several parts: an index to the document that contains the passage (301), an optional passage score (302), an annotated representation, or processed query (303) of the user question (5), and an annotated representation (304) of the passage (6).

Figure 9:
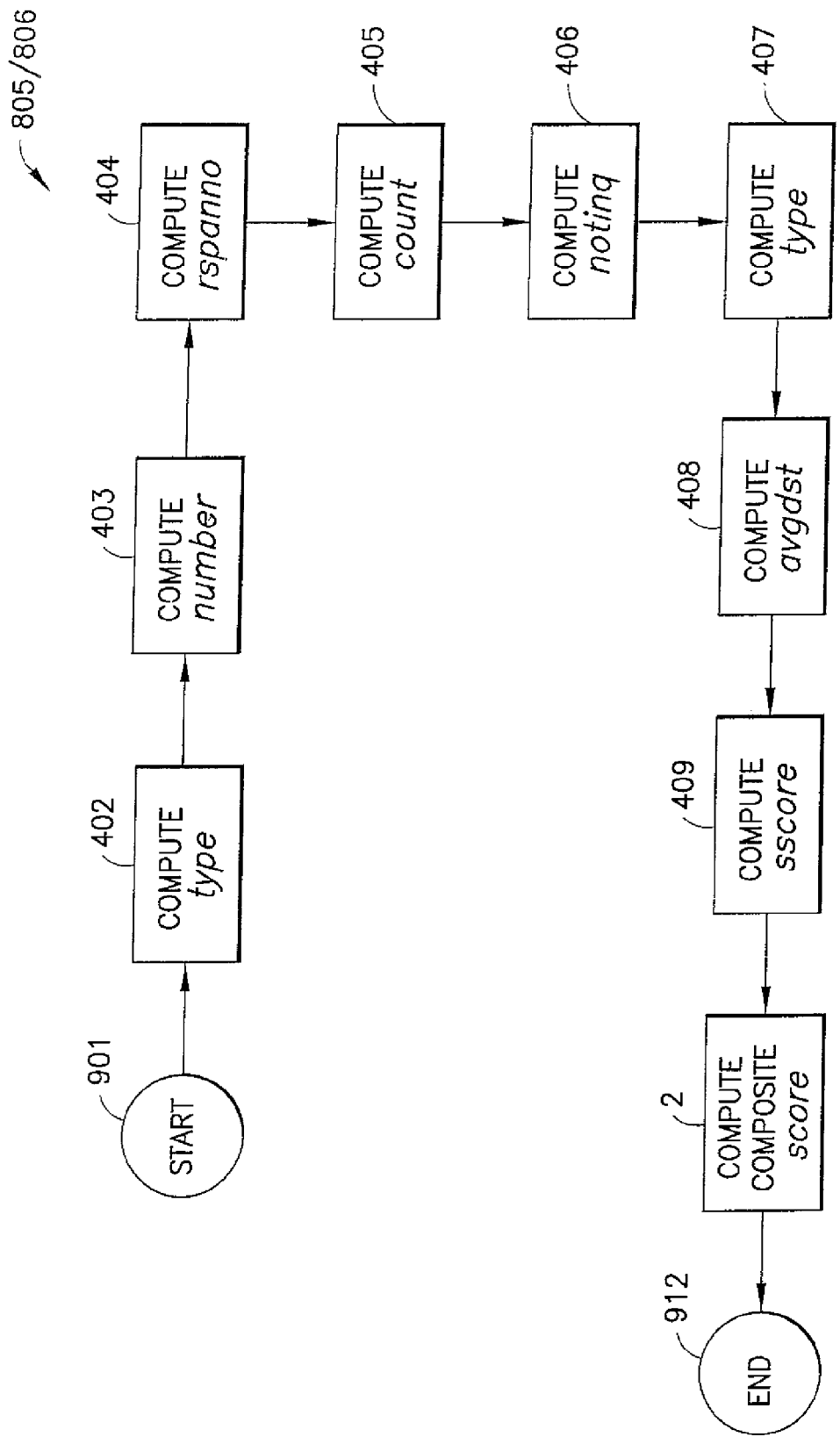
FIG. 9 is a flowchart showing the "EXTRACT FEATURES" (805) and "COMPUTE COMPOSITE SCORE" (806) procedures which ate jointly used in the EXECUTION and the TRAINING component.

The different features in the feature set are combined by the feature combination module (2, shown also on FIG. 9) to provide a set of composite features (8), one or more pet question-document pair Based on the feature set (7), the feature combination module also produces a set of potential answers (9) which contains the likely answers to the question (5) as well as zero or more less likely answers. In the preferred embodiment, the following features (402-409) are used, among others. FIG. 9 is a flowchart describing the process of computing the different features and combining them into a single score Feature 402 (type) is the semantic type of the current suspected answer. For example, the semantic type of "Lou Vasquez" is "PERSON" The processed query (303) indicates the semantic type of the potential answers that are most likely to be relevant to the given question. For example, the semantic types of the most likely answers to a Who question are "PERSON", "ORG", "NAME", and "ROLE" as indicated in 303.

Feature 403 (number) represents the position of the suspected answer among all suspected answers within all document passages. Example: "Lou Vasquez" is the first suspected answer in 400.

Feature 404 (rspanno) is the position of the suspected answer among all suspected answers within the given passage Example: "Derric Evans" is the fourth suspected answer within the passage in which it appears.

Feature 405 (count) is the number of suspected answers of a given semantic type retrieved within a given passage.

Feature 406 (notinq) represents the number of words in a suspected answer that do not appear in the user question Example: Notinq ("Woodbridge high school")=1, because both "high" and "school" appear in the query while "Woodbridge" does not. Whenever the actual value of notinq is zero, then the value is replaced with a very high negative value to indicate that the current potential answer is highly unlikely to be correct.

Feature 407 (type) is the position of the semantic type in the list of potential semantic types for the question Example: Type ("Vasquez")=1, because the span type of "Lou Vasquez", namely "PERSON" appears first in the list of potential span types, "PERSON ORG NAME ROLE".

Feature 408 (avgdst) represents the average distance in words between the beginning of the potential answer and the words in the question that also appear in the passage Example: given the passage "Tim O'Donohue, Woodbridge High School's varsity baseball coach, resigned Monday and will be replaced by assistant Johnny Ceballos, Athletic Director Dave Cowen said" and the span "Tim O'Donohue", the value of avgdst is equal to 8.

Feature 409 (Sscore) is the passage relevance as computed the retrieval engine.

Other features that are not included in the example here include (a) the frequency of a given potential answer on the list, (b) the semantic relation between words from the question and words from the potential answer, and (c) a strength score that is a function of the relevance score 409.

Figure 7:
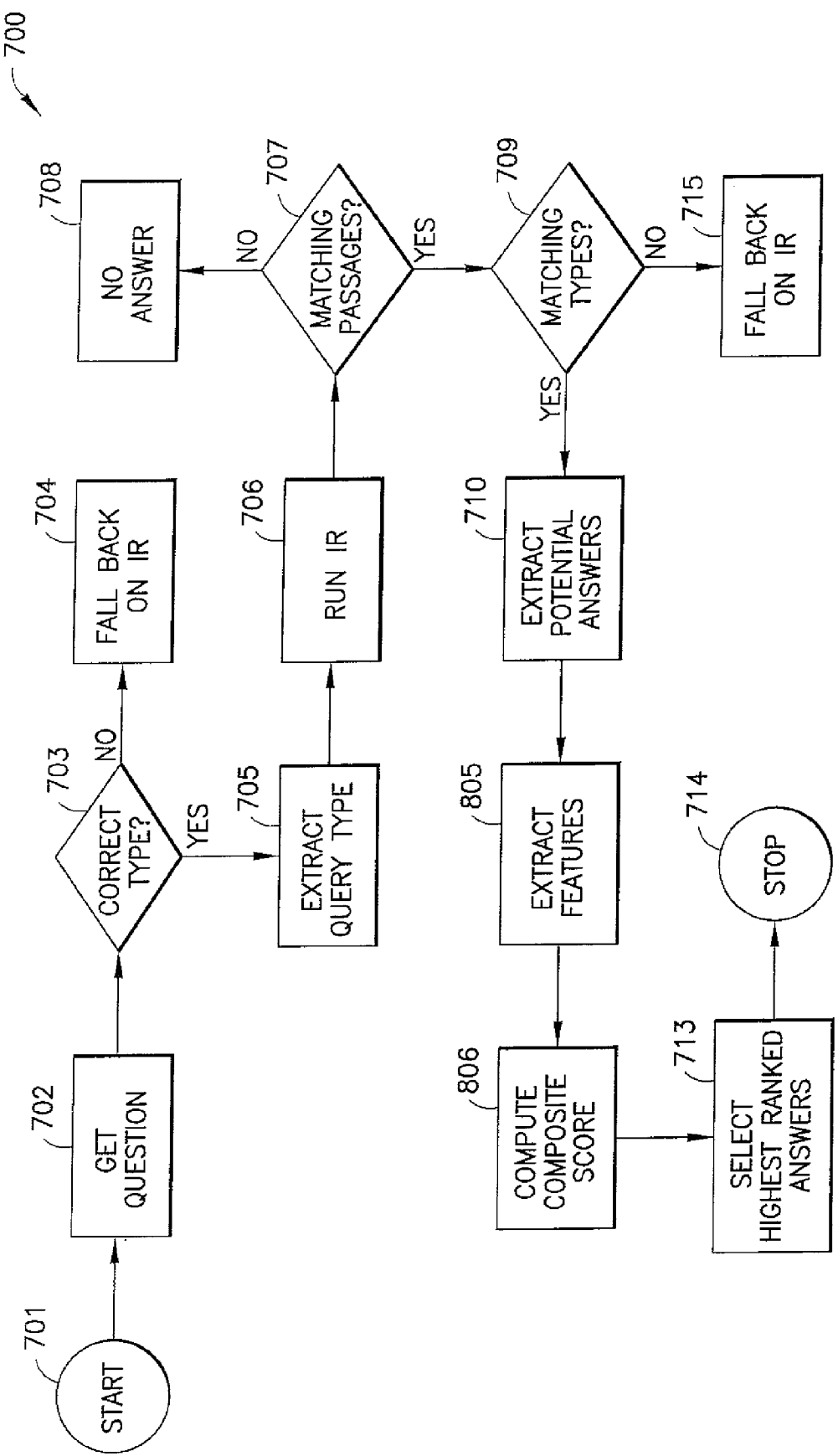
FIG. 7 is a flowchart showing how the EXECUTION component of the invention operates.

The feature combination module (see item 710 in FIGS. 7 and 8) uses either a statistical or a manual technique to determine the best formula to combine the different features. A statistical technique used in the preferred embodiment is logistic regression (prior art) In the preferred embodiment, these techniques work as follows: a set of questions and lists of potential answers are annotated semantically. All features are computed and based on developer-specified correct answers, the system learns (item 808, see FIG. 8) the proper function to combine all features. In alternative embodiments, the function can be specified manually. In the preferred embodiment, the function is a linear combination of all features:

$$F = \sum_{i=1}^{n} w_i f_i$$

In his formula, F is the composite function; $f_i$ are the different features used, $w_i$ are the weights associated with these features, and n is the total number of features.

The learning system 808 operates as follows: a set of questions if obtained through one or more interfaces (802), the matching passages (803) are obtained using a search engine or by other means, including manually, potential answer passages (804) are extracted, features (805) are also extracted (as in FIG. 7), The composite score is computed (806), then all potential answers are ranked based on their score (807), and the ranking, along with the set of features is used to learn a discrimination function (808) which will be later used to classify potential answers into more or less likely ones.

Figure 8:
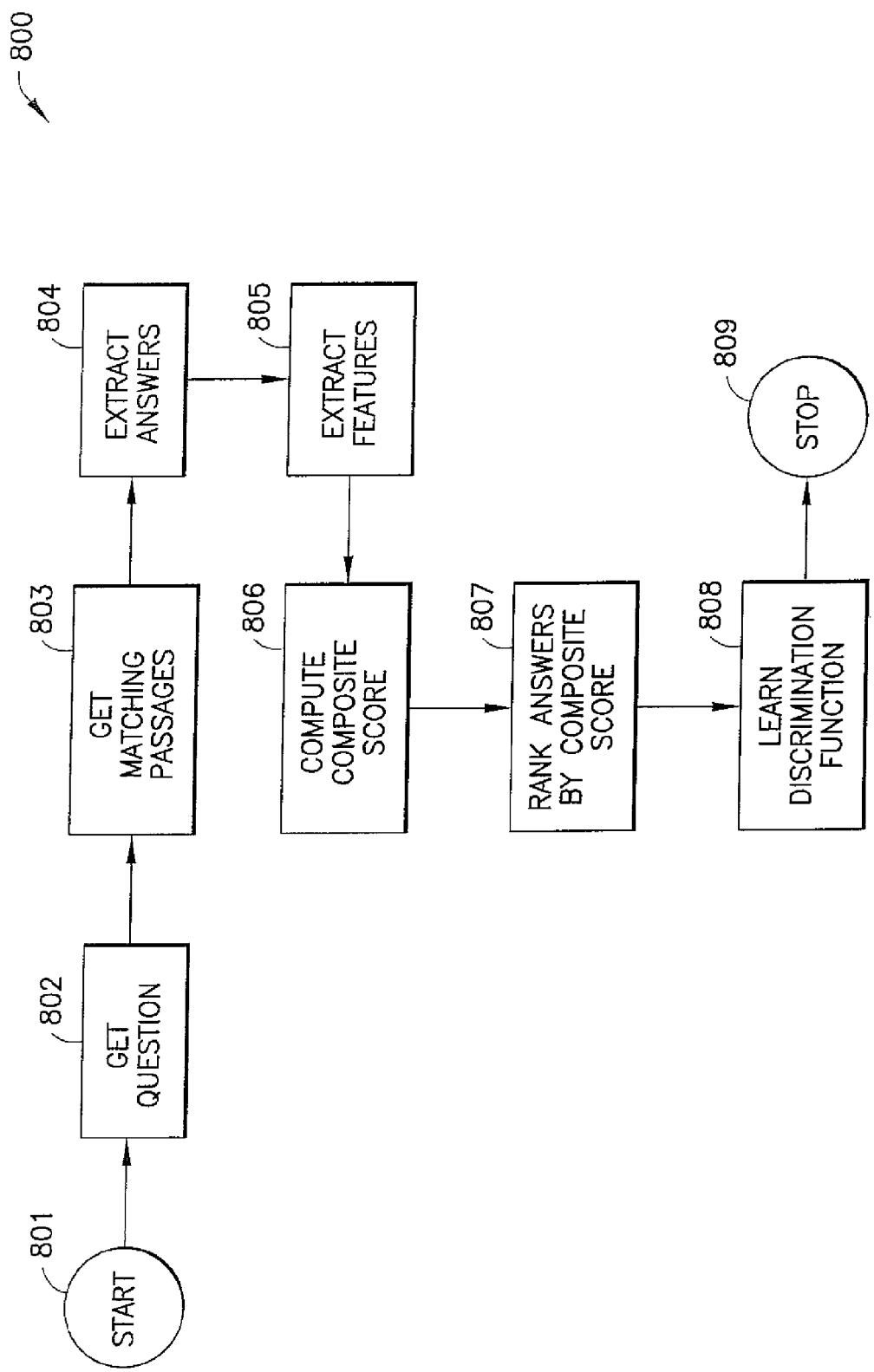
FIG. 8 is a flowchart of the TRAINING component of the invention.

The answer selection module (3) uses the composite features (8) and the set of potential answers (9) to produce a ranked list of potential answers (10). Answers near the beginning of that ranked list are assumed to be mole likely answers to the original question (5). In more detail, the answer selection module is described in FIG. 7. The first step is to get a question (702), then decide whether it is of the correct type (703, factual question, e.g., but not limited to why, where, and how much questions). If the question is not of the right type, the system rejects it and defaults on a search engine (704). Otherwise, the system extracts the type of the question (including, but not limited to when, what, where questions). Next, a search engine (at least, in the preferred embodiment) is used (706) to extract matching passages to the query. If there are no matching passages (707), the system says so (708). Otherwise, control is passed to box 709 which decides whether the documents containing the potential answers returned by the search engine do contain the answer at all, to begin with. If no, the system again falls back on IR (715) If there are answers, the system extracts their type (e.g., why, where, etc.), see box 710. The next two boxes: 805 and 806 are the same as during the training stage (FIG. 8). The final box (713) selects the highest ranking documents.

In FIG. 4, the likeliest answers to the user question are the ones with the highest composite score Example: "Lou Vasquez" has a score of −9.93 which is higher than all other scores. FIG. 5 shows an example containing a number of the highest-ranking potential answers (501).

Finally, the answer presentation module (4) adds a certain amount of context (zero or more characters) to the answers ranked highest within the ranked list (10). The resulting set of answers along with the neighboring contest are presented to the user in the form of a set of likeliest answers (11) FIG. 6 shows an example (600) from the preferred embodiment which indicates all of the following: (a) the highest-ranking answers (601), (b) their scores (602), (c) the context in which they appear (603), and (d) pointers to the document where they appeal (604).

The answer presentation ascertains that the same potential answer doesn't appear more than once in context. If the context is too large and allows for more than one highly-ranked potential answer to be included, the answer presentation module inserts additional, lower-ranked answers to make use of all space available.

Operation of the Invention

In the preferred embodiment, the invention can handle arbitrary factual questions, including but not limited to where-, when-, what-, how-, and what-questions The set of documents from which the answer s are extracted can be one of the following: a collection of documents physically or virtually residing on the user's local area network (LAN) or intranet, an indexed encyclopedia, or the entire Web, or any combination of the above. The user can specify one or more questions using one or more interfaces. The invention analyzes the question or questions as well as the entire collection of documents

EXAMPLE

User inputs a question "Who was Johnny Mathis' high school track coach?" in box (5) of FIG. 1. The input to the system consists of the user input (5) as well as a set of document passages (6) that are deemed likely to contain answers to the user question (5). In the preferred embodiment, the related passages ate retrieved by an information retrieval system (or search engine) which may be similar to the one described in Patent Filing IBM Y0999-503. The structure of the user question (5) is shown in FIG. 2 while the document passage input (6) is presented in FIG. 3.

The invention analyzes the user question and stores all words from the question, as well as a representation of the logical structure of the question. For the document collection, the invention extracts portions that are considered most likely to contain a factual answer related to the user question. These portions are analyzed and annotated with a number of automatically computed features, similar to but not limited to the ones shown in Table 1. The composite feature is shown in the TOTAL column of Table 1.

The contents of Table 1 are sorted based on the composite feature. The highest ranked answers (as shown in the first column) ate presented to the user, possibly in a user-specified context. In the example, the likeliest answer to the question "Who was Johnny Mathis' high school track coach" is "Lou Vasquez" with a total score of −9.93 which is higher than all other scores.

We claim:

1. A method for selecting answers to natural language questions from a collection of textual documents comprising the steps of:
    extracting scoring features from a candidate list of passages of possible answers, wherein said scoring feature is an average distance between the beginning of a candidate answer in a passage and words in said natural language question that appear in said passage, and wherein said average distance is measured in a count of words;
    scoring the possible answers using the extracted scoring features and a features scoring function; and
    presenting the best scoring possible answer to the user with context from the passage containing the answer, wherein one or more of said steps are performed by a hardware device.

2. A method as in claim 1, wherein the feature scoring function is a linear combination of weighted features.

3. A method as in claim 2, wherein the parameters of the scoring function are manually determined.

4. A method as in claim 2, wherein the parameters of the scoring function are learned by a machine learning algorithm.

5. A method as in claim 1, wherein the candidate list of passages of possible answers is obtained from the collection of documents using an information retrieval engine.

6. A system for selecting answers to natural language questions from a collection of textual documents, comprising:
    a memory; and
    at least one processor, coupled to the memory, operative to:
    extract scoring features from a candidate list of passages of possible answers, wherein said scoring feature is an average distance between the beginning of a candidate answer in a passage and words in said natural language question that appear in said passage, and wherein said average distance is measured in a count of words;
    score the possible answers using the extracted scoring features and a features scoring function; and
    present the best scoring possible answer to the user with context from the passage containing the answer.

7. A system as in claim 6, wherein the feature scoring function is a linear combination of weighted features.

8. A system as in claim 7, wherein the parameters of the scoring function are manually determined.

9. A system as in claim 7, wherein the parameters of the scoring function are learned by a machine learning algorithm.

10. A system as in claim 6, wherein the candidate list of passages of possible answers is obtained from the collection of documents using an information retrieval engine.

11. A article of manufacture for selecting answers to natural language questions from a collection of textual documents, comprising a machine readable medium containing one or more programs which when executed implement the steps of:
    extracting scoring features from a candidate list of passages of possible answers, wherein said scoring feature is an average distance between the beginning of a candidate answer in a passage and words in said natural language question that appear in said passage, and wherein said average distance is measured in a count of words;
    scoring the possible answers using the extracted scoring features and a features scoring function; and
    presenting the best scoring possible answer to the user with context from the passage containing the answer.

* * * * *